Feb. 10, 1925.

A. GARDUÑO

SEED PLANTING MACHINE

Filed July 2, 1923

1,526,275

Inventor
Adalberto Garduño
by B. Singer atty

Patented Feb. 10, 1925.

1,526,275

UNITED STATES PATENT OFFICE.

ADALBERTO GARDUÑO, OF TOLUCA, MEXICO.

SEED-PLANTING MACHINE.

Application filed July 2, 1923. Serial No. 649,120.

*To all whom it may concern:*

Be it known that I, ADALBERTO GARDUÑO, a citizen of the Republic of Mexico, and a resident of Toluca, State of Mexico, Republic of Mexico, have invented certain new and useful Improvements in Seed-Planting Machines, of which the following is a specification.

This invention relates to seed planting machines, and especially to a seed planting machine wherein are combined different appliances for effecting various other operations connected with the planting of the seed.

With the above and other objects in view, the invention consists in the construction, combination and arrangement of devices hereinafter described and claimed.

In the accompanying drawings.

Like numerals designate corresponding parts throughout the several figures of the drawings.

Figure 1:
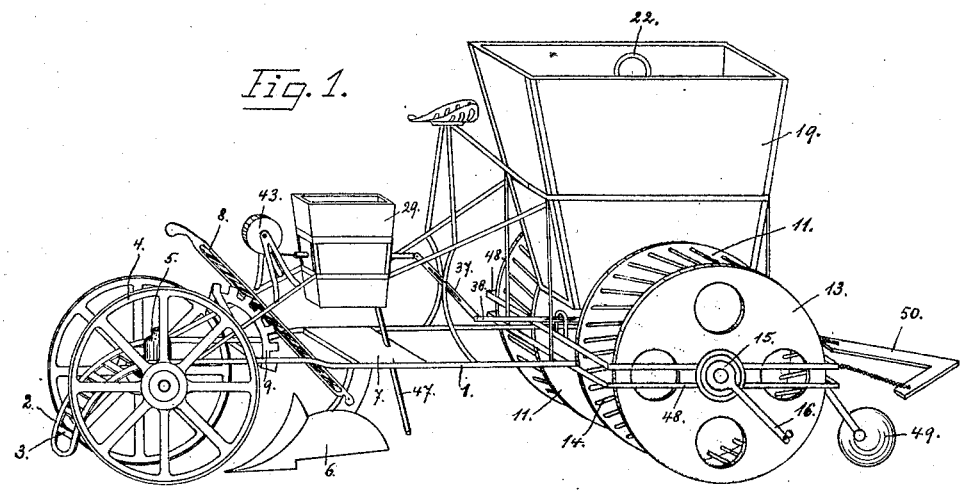
Fig. 1 is a side elevation of the complete machine.

The machine consists of a frame 1, the doubled and curved down front extremity of which (2) is narrower than the rest of the frame and provided with transversal rungs 3 which permit the fastening of the double-tree at different heights so as to balance the machine properly. The axle of the front wheels 4 passes under frame 1 and pivots on a pin which enters a cylindrical vertical bearing 5 provided between the arms of said frame.

The plow 6 is fastened back of the front wheels to a cross member 7 located between the arms of frame 1 and can be lifted or lowered by means of an adjustable lever 8 which engages a toothed segment 9 fastened to frame 1.

Figures 2, 3:
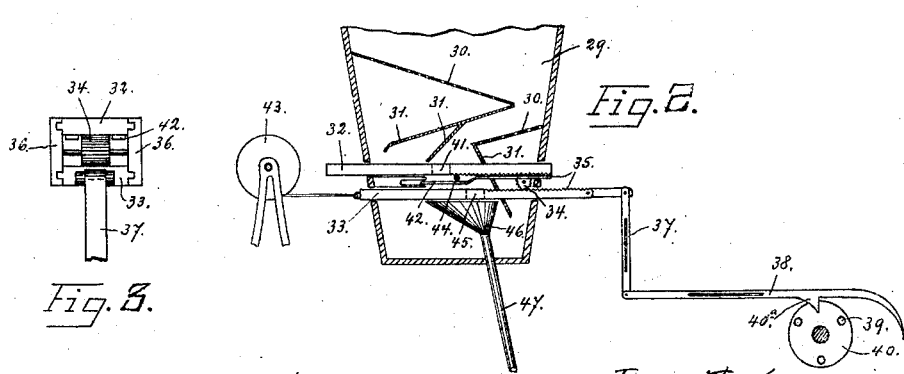
Fig. 2 is a partly sectional view of the seed measuring and distributing device.
Fig. 3 is a rear view of said seed measuring device.

Through the rear end of frame 1 passes the axle 10 of the rear wheels. Each one of these wheels consists of an inner disc or wheel 11 provided with a separate hub 12. An outer wheel 13 provided with a number of laterally extending iron bars 14 fits over each end of axle 10, the opposite ends of the bars 14 entering corresponding holes in the wheel 11, while the wheels 13 are pressed against the wheels 11 by means of a nut 15 which is screwed to the end of the axle 10 and tightened by a crank 16. One of the rear wheels mounted in this way is shown on the left side of Figure 2, and forms a broad base, the bars 14 serving to crush or crumble the clods of soil remaining after plowing.

The fertilizer depositing mechanism is arranged in a hopper.

The sowing mechanism is mounted back of the plow over the frame 1. It consists of a rectangular hopper 29 provided inside with inclined screens 30 which permit the seed to be cleaned on passing over them, the dirt and small broken seeds being guided by fixed partitions 31 and falling into the bottom of the hopper to be taken out later. The clean seed is guided by the same screens and partition to fall upon the measuring and timing device which principally consists of two sliding bars moving in opposite directions. These bars 32 and 33 are operated by means of a stationary pinion 34 which engages racks fastened to or cut in the lower and the upper side respectively of the bars 32 and 33. Both bars run in grooves provided in the side pieces 36, shown in Figure 6 but not shown in Figure 5 to make the working of the mechanism more clearly understood. The bar 33 is connected at one end with a lever 37 and this lever with another lever 38 which in turn is moved by the cross pins 39 located between the wheel 40 and the wheel 20 of the rear axle 10. Said cross pins engage a stop 40$^a$ provided on the lever 38 which moves said lever in a forwardly direction and retires by means of lever 37 the bar 33. When this bar is pulled back, the bar 32 moves forward and the seed falls into a hole 41 provided in same. From this hole the seed falls upon the flexible tongue 42, the amount of the seed being measured by the diameter of the hole 41 and by the distance between the bar 32 and the tongue 42.

When the pin 39 lets loose the stop 40$^a$ of lever 38, the bar 35 is drawn forward by a spring contained in the casing 43 and the bar 32 moves backward. The seed deposited on the tongue 42 is stripped off by the stationary cross pin 44 fastened to one or both sides 36, and falls through the hole 45 of bar 33 into the hopper 46 from which it is discharged by the tube 47 into the furrow made by the plow 6.

The movements of the seed and of the fertilizer depositing devices are so timed that each measured amount of fertilizer falls exactly over the seeds deposited by each reciprocating movement of the sowing mechanism.

A frame 48 encircles the rear wheels and is preferably so constructed that its sides may be disconnected for separating the wheels 13 and the bars 14. To the back of this frame may be fastened discs 49 for covering the furrow made by the plow, and drags 50 for smoothing and planing the soil.

I claim:

In a seed planting machine, a hopper for receiving the seed, screens provided inside of said hopper for cleaning and selecting the seed, a pair of sliding bars located one above the other, movable in opposite directions, and each having a hole in the center, a tongue fixed to the upper bar and extending between said bars and under the hole of the upper bar, a fixed pin between said upper bar and said tongue when said upper bar is moved, means for operating said bars, and a hopper provided under said lower bar for receiving the seed and depositing it in the furrow.

In testimony whereof I affix my signature in presence of two witnesses.

ADALBERTO GARDUÑO.

Witnesses:
H. M. BERGER,
JOSÉ MUNGEN.